US010572395B2

(12) United States Patent
Pikhur et al.

(10) Patent No.: US 10,572,395 B2
(45) Date of Patent: Feb. 25, 2020

(54) NON-ENCLAVE ACCESS PREVENTION

(71) Applicant: Intel Corporation, Santa Clara, CA (US)

(72) Inventors: Volodymyr Pikhur, Santa Clara, CA (US); Atul A. Khare, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 587 days.

(21) Appl. No.: 15/258,007

(22) Filed: Sep. 7, 2016

(65) Prior Publication Data

US 2018/0067873 A1 Mar. 8, 2018

(51) Int. Cl.
*G06F 21/00* (2013.01)
*G06F 12/14* (2006.01)

(52) U.S. Cl.
CPC .. *G06F 12/1441* (2013.01); *G06F 2212/1052* (2013.01); *G06F 2212/402* (2013.01)

(58) Field of Classification Search
CPC ......... G06F 12/1441; G06F 2212/1052; G06F 2212/402
See application file for complete search history.

(56) References Cited

U.S. PATENT DOCUMENTS

2007/0222610 A1* 9/2007 Tagato ............. G06K 19/07336 340/572.7
2008/0216073 A1* 9/2008 Yates .................. G06F 9/30174 718/100
2011/0277013 A1* 11/2011 Chinta ................ G06F 21/6218 726/1
2014/0317372 A1* 10/2014 Herrick ............... G06F 12/1458 711/163
2015/0301761 A1* 10/2015 Sijstermans .......... G06F 3/0623 711/163
2016/0085695 A1* 3/2016 Leslie-Hurd ........ G06F 12/1441 711/163

* cited by examiner

*Primary Examiner* — Jeffrey C Pwu
*Assistant Examiner* — Rodman Alexander Mahmoudi
(74) *Attorney, Agent, or Firm* — Lowenstein Sandler LLP

(57) ABSTRACT

A processing system includes an execution unit comprising a logic circuit to implement an architecturally-protected execution environment associated with a protected region in a memory, in which the execution unit is to execute application code stored in the protected region as a thread running in the architecturally-protected execution environment, determine that an access mode flag is set to a first value, detect an attempt by the thread to access data stored outside the protected region, and responsive to detecting the attempt and determining that the access mode flag is set to the first value, generate an exception.

18 Claims, 12 Drawing Sheets

EPC Page for Enclave Control Structure 200

400

NON-ENCLAVE ACCESS PREVENTION

TECHNICAL FIELD

The present disclosure relates to processors and, more specifically, to a processor including circuit logics to prevent instructions executed within an architecturally-protected execution environment (e.g., a secure enclave) from accessing data outside the architecturally-protected execution environment.

BACKGROUND

An operating system (OS) may employ a protection ring system (e.g., including ring 0-3) to protect the OS from unwanted accesses originated from applications and protect an application from unwanted accesses from another application. The ring system, however, does not protect an application from attacks from a malicious application that exploits a flaw in the OS and gained the full privilege of the OS. Thus, the malicious application may utilize the illegally-gained privilege (e.g., privilege of ring 0-2) to temper the application that is at a less privilege level (e.g., ring 3).

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
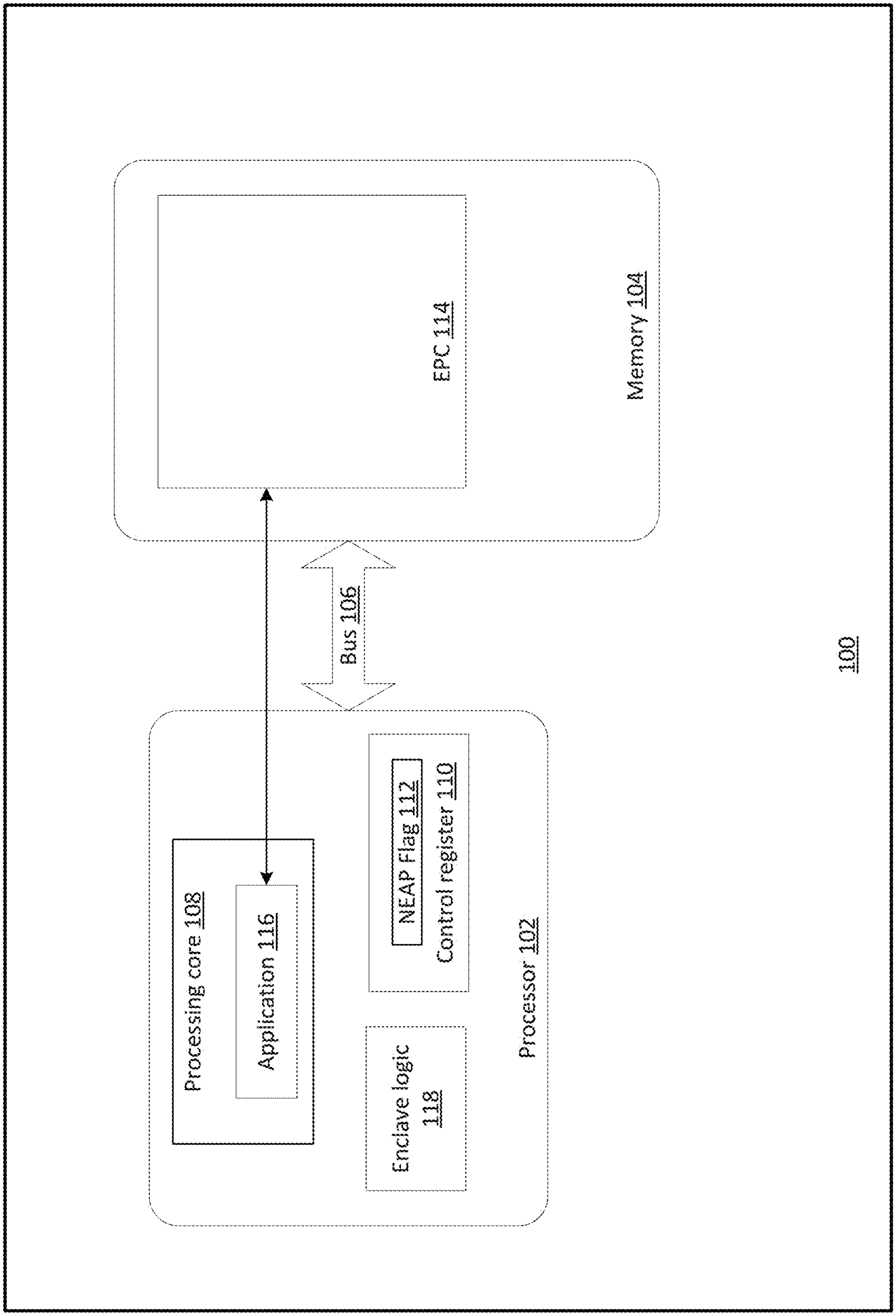
FIG. 1 illustrates a processing system according to an embodiment of the present disclosure.

Although the ring system may protect memory regions reserved for applications running at a higher privilege level against unauthorized accesses by application running at a lower (or equal) privilege level, the ring system does not protect data used by an application of lower privilege level against accesses by an application running at higher privilege levels. In certain situations, the application running at a higher privilege level (e.g., the operating system or the virtual machine monitor (VMM)) may have been compromised by malicious attacks. The compromised applications may make furthers attacks on data used by an application running at a lower privilege level. In some implementations, an application running on a processor at a lower privilege level (e.g., ring 3) may be provided with an architecturally protected memory region to store code and data that is private to the application and cannot be accessed by a higher privilege level application (e.g., an application with a ring 0-2 privilege). Thus, a processor may execute a portion or whole of the lower privileged application in the architecturally protected execution environment, protected against malicious attackers that pretend to have higher privileges.

In some implementations, the architecturally protected execution environment can be provided in the form of a secure enclave. A secure enclave may be associated with a protected area (referred to as an enclave memory region) within the memory address space associated with the application. An access to the enclave memory region by other applications not residing in the secure enclave is prohibited even if such an access is attempted by a higher-privileged application such as operating systems or virtual machine monitors.

Current implementations of the secure enclave, however, do not protect the enclave integrity from accidental or intentional software errors by applications executing within the secure enclave (referred to as enclaved applications). These errors may include the application residing in the secure enclave attempts to access data outside of the enclave memory region. Software solutions may be employed to determine whether a data access attempted by the enclaved application is directed to inside or outside of the enclave memory region. This type of software solutions, however, may create vulnerabilities that may allow attacks on the integrity of the enclave. Examples of such attacks may include integer overflows or buffer overflows.

Embodiments of the present disclosure include circuit logics that may be employed to selectively turn off memory accesses by an enclaved application to data stored outside of the enclave memory region. A settable flag (referred to as "non-enclave access prevention" flag or NEAP flag) may be stored in a control register associated with a processor. When the NEAP flag is enabled (e.g., set to "1"), responsive to determining an attempt by an enclaved application to access a memory location outside of the enclave memory region of the secure enclave, the circuit logic associated with the processor may generate an exception (e.g., # PF exception) which may inform the operating system of this impermissible access attempt. When the NEAP flag is not enabled (e.g., set to "0"), the attempt by the enclaved application to access a memory location outside of the secure enclave can be handled by the software solution.

Described herein are processing systems and related methods for providing and enabling hardware features that prevent an enclaved application from accessing a memory location outside of the secure enclave. Applications being executed by an example processing system and the data accessed by such applications may be protected at the micro-architectural level, e.g., by implementing secure enclaves, as described in more details herein below.

FIG. 1 illustrates a processing system according to an embodiment of the present disclosure. As shown in FIG. 1, processing system 100 (e.g., a system-on-a-chip (SOC)) may include a processor 102 and a memory device 104 communicatively coupled to processor 102 via a bus 106. Processor 102 may be a hardware processing device such as, for example, a central processing unit (CPU) or a graphic processing unit (GPU) that includes one or more processing cores (not shown) to execute software applications. Processor 102 may further include one or more processing cores 108 and a register file including a control register 110 that is communicatively coupled to processor core 108. Processing cores 108 may be associated with multiple level caches including level L1-L3 caches.

Figure 6:
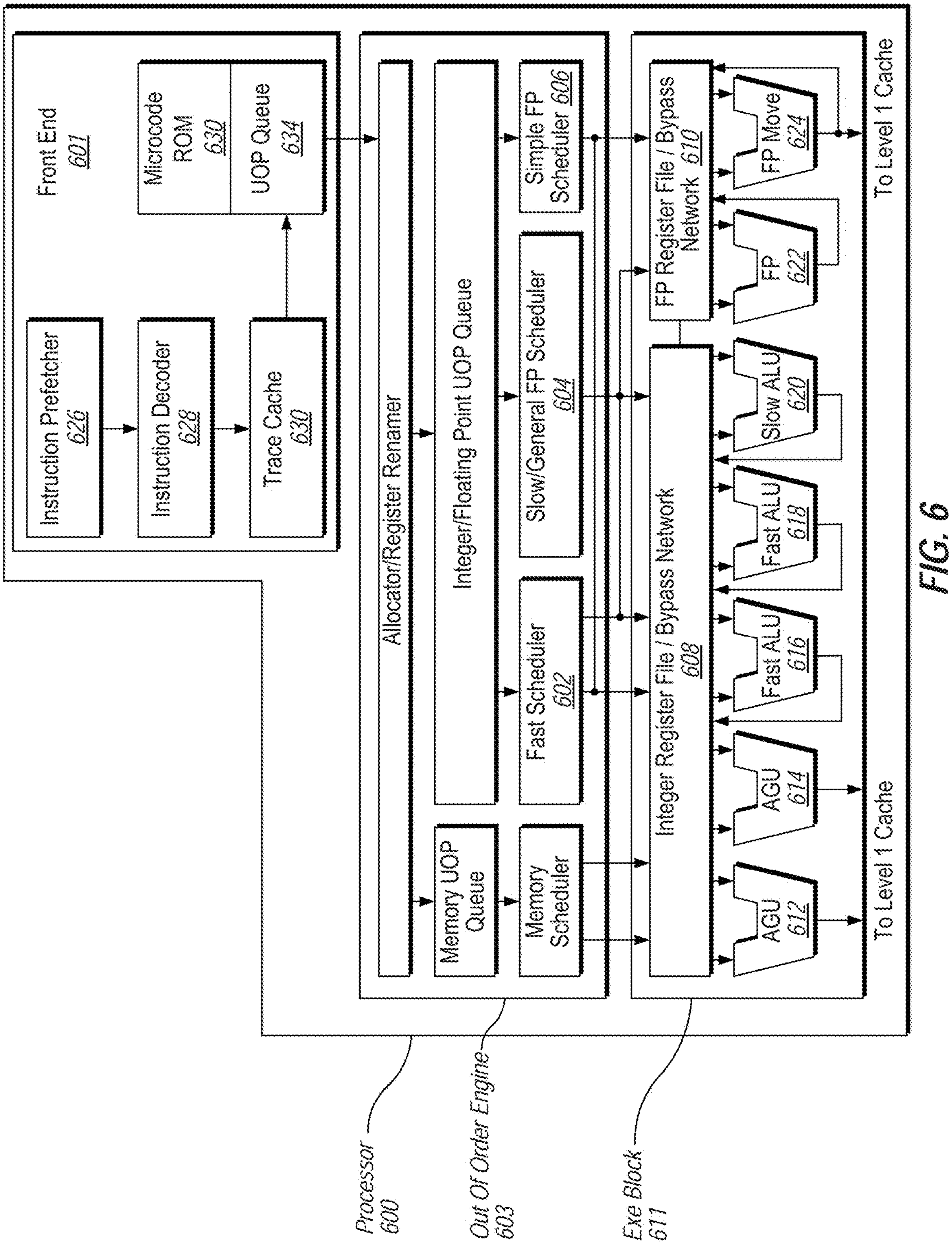
FIG. 6 illustrates a block diagram of the micro-architecture for a processor that includes logic in accordance with one embodiment of the disclosure.
Figure 7:
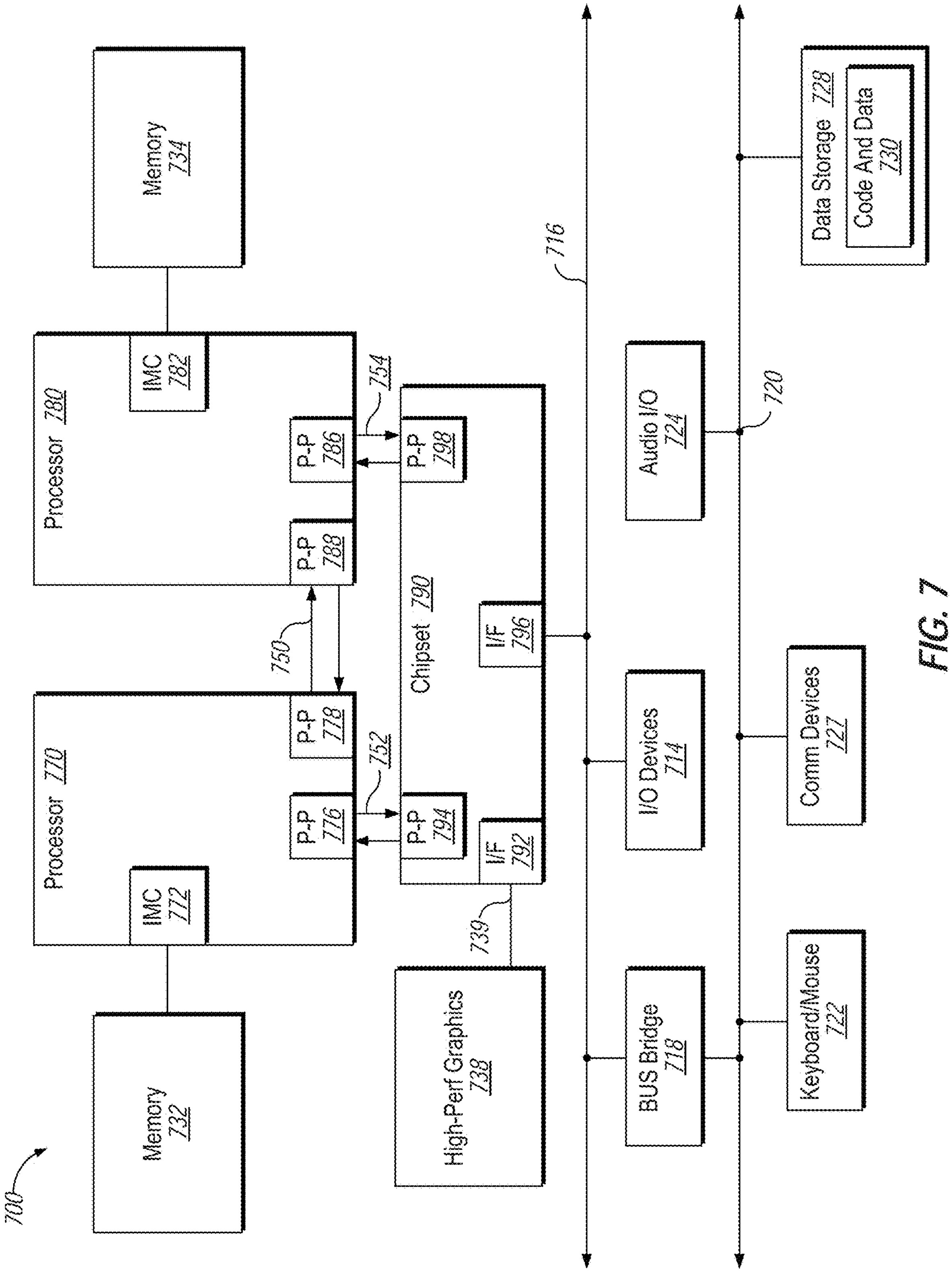
FIG. 7 is a block diagram illustrating a system in which an embodiment of the disclosure may be used.

Processing cores 108 in various implementations may be provided by in-order cores or out-or-order cores. In an illustrative example, processing core 108 may have a micro-architecture including processor logic and circuits used to implement an instruction set architecture (ISA). Processors 102 with different micro-architectures can share at least a portion of a common instruction set. For example, the same register architecture of the ISA may be implemented in different ways in different micro-architectures using various techniques, including dedicated physical registers, one or more dynamically allocated physical registers using a register renaming mechanism (e.g., the use of a register alias table (RAT), a reorder buffer (ROB) and a retirement register file), as illustrated by FIGS. 6-7. In certain implementations, processing system 100 may also include various other components not shown in FIG. 1.

Processor 102 may include internal memory, referred to as the register file. The register file may include static random access memory (SRAM) cells, generally known as registers. Control register 110 is a register in the register file of processor 102 that may store information that changes or controls the behavior of processor 102 or other devices associated with processor 102. In one embodiment, processing core 108 may execute a software application 116. For example, application 116 can be a user application that has a ring-3 level of privilege. The ring-3 level of privilege does not secure application 116 from software applications of ring-0 to ring-2 privileges. To protect application 116 against ring-0-ring-2 applications, application 116 can be run in an architecturally-protected execution environment such as an enclave.

In accordance with one or more aspects of the present disclosure, processing system 100 may comprise an architecturally protected memory. For example, a region of memory 104 may be a protected region (referred to as enclave page cache (EPC)) 114 that can be architecturally protected by a processor extension 118 (referred to as an enclave logic) that may implement software safeguard extensions (SGX) instructions that, when executed, may perform services related to secure enclaves. The SGX instructions may include instructions to create (ECREATE), load (EADD), and initialize (EINIT). The system software may execute an enclave create instruction to generate a secure enclave. The creation of the secure enclave may generate a new SGX enclave control structure (SECS) including fields to store attributes associated with the secure enclave.

In some implementations, the memory region is the processor reserved memory (PRM). Processor 102 protects the PRM from accesses by other applications including the kernel of the operating system and VMM. The PRM can hold the enclave page cache (EPC) 114. EPC 114 is a protected memory region used by the processing system to temporarily store enclave pages when they are not cryptographically protected. EPC 114 may be divided into pages of a pre-defined size (e.g., 4 kB, which may be referred to as EPC pages. EPC 114 and EPC pages therein may be protected from any accesses by software residing outside the enclave. Furthermore, unauthorized parties will not be able to read or modify plain-text data belonging to enclaves that is loaded into the EPC via straight-forward hardware attacks. EPC 114 is located within the physical address space of the processing system, but can only be accessed using privileged or non-privileged enclave instructions used to build and enable an enclave, enter/exit the enclave, manage EPC, and perform various other operations.

There are several mechanisms of implementing the EPC 114. The EPC 114 may be implemented as an on-die static random access memory (SRAM) or dynamic random access memory (DRAM). Alternatively, the EPC 114 may be constructed by sequestering ways of the CPU's last-level cache. Another mechanism of implementing EPC 114 is the Memory Encryption Engine (MEE). MEE herein shall refer to a hardware-implemented processing logic that encrypts the traffic between the processor package and the platform DRAM, thus providing a mechanism of creating a cryptographically protected volatile storage using the platform DRAM. MEE may intercept attempted memory accesses and route those accesses to a cryptographic controller, which may generate one or more memory accesses to the platform DRAM to fetch the cipher-text, processes the cipher-text to generate the plain-text, and satisfy the original memory access request.

In one embodiment, the EPC pages in the EPC 114 may store the code and data associated with application 116 to architecturally prevent other applications from accessing them. Further, the SECS discussed above may be stored in a special EPC page (referred to as an SECS page) that is not addressable by applications not residing in the secure enclave. The attributes in the SECS page may include an enclave identifier that uniquely identifies the secure enclave. The execution of the enclave creation instruction marks the newly created SECS as uninitialized.

While in the uninitialized state, the system software may execute the enclave load instruction to add code and data into EPC 114 of the secure enclave. The EPC pages associated with the secure enclave may include regular EPC pages to store code and data, and Thread Control Structure (TCS) pages stored in dedicated EPC pages (referred to as TCS pages). Each TCS page may include fields to store attributes associated with a logical processor of processor 102 for executing a thread of the code residing in EPC 114 of the secure enclave. After completion of loading a secure enclave, the system software may execute the enclave initiate instruction to launch the secure enclave. Once the secure enclave is launched, the code and data in the secure enclave is not accessible by other applications including system software applications that have high privileges.

The code of application 116 may reside in EPC pages in EPC 114 that is protected by the secure enclave. Further, application 116 may access data residing in the EPC pages of the protected EPC 114. Application 116 is referred to as an enclaved application.

The Enclave Page Cache Map (EPCM) is a protected structure employed by the processing system to track the contents of the EPC 114 to ensure that each EPC page is associated with one secure enclave. The EPCM may comprise a plurality of entries with each entry corresponding to an EPC page in the EPC. Each EPCM entry may hold, in an implementation-dependent format, the following information: whether the EPC page is valid or invalid; an identifier of the enclave instance that owns the page; the type of the page (REG, TCS, SECS); the virtual address through which the enclave is allowed to access the page; read/write/execute permissions for the page; whether the page is accessible or not (BLOCKED or UNBLOCKED).

The EPCM may be used by the processing system in the address translation flow to enforce access-control on the enclave pages loaded into the EPC. Logically it provides an additional secure layer of access control in addition to "legacy" segmentation, paging tables and extended paging tables mechanisms.

Current implementations of enclave logic in processor 102 prevent software applications other than the enclaved application from accessing data in the EPC of a secure enclave, but do not include logics to prevent the enclaved application from attempting to access data outside of the enclave. Instead, current implementations rely on software solutions (e.g., determining whether an address pointer tries to access inside or outside of the enclave). As discussed above, the software solution is error prone and is subject to malicious attacks that may compromise the integrity of the enclave.

Embodiments of the present disclosure include a processor 102 including logic circuits in enclave logic 118 that can be selectively enabled based on the value of an accessing mode flag (NEAP flag 112) stored in a control register 110. Responsive to determining that the value of NEAP flag 112 stored in control register 110 indicates preventing the non-enclave access by an enclaved application, enclave logic 118 may detect any attempts by an enclaved application 116 (including its threads) to access data outside of EPC 114 and generate a hardware exception (e.g., a page fault # PF exception). The hardware exception may include a status bit to allow the operating system to determine that the hardware exception is caused by the enclaved application attempting to access data outside the enclave.

As shown in FIG. 1, processor 102 may include control register 110 to store the value of NEAP flag 112 and enclave logic 118 for determining that the value of NEAP flag is enabled. Enclave logic 118 may generate a hardware exception responsive to any attempt by enclaved application 116 to access data outside EPC 114. Control register 110 is an internal register of processor 102 and is associated with a particular enclave defined by an enclave identifier stored in a SECS page.

In one embodiment, rather than employing a single NEAP flag 112 for all enclaves, each enclave is associated with a respective control register for storing a respective value of NEAP flag associated with the corresponding secure enclave. Each of the NEAP flag stored in the control registers may be set by the processor separately, thus providing the flexibility to handle each secure enclave differently. The NEAP flag can be one bit that indicates the enablement of the "non-enclave access prevention" mode when the flag is set to the value "1" and the non-enablement of the "non-enclave access prevention" mode when the flag is set to the value "0."

System software such as, for example, the operating system or the VMM, may employ an application programming interface including instructions to create, load, initiate, and destruct an enclave. The create instruction (ECREATE) may convert a free EPC page into a special EPC page to store the enclave control structure. A secure enclave is created when the enclave control structure is stored in the special EPC page. The enclave control structure may store attributes associated with the secure enclave. In particular, an initial (INIT) attribute whose value is set to false. Thus, code associated with the enclave cannot be executed until the value the initial attribute is set to true.

When a secure enclave is created and is still in the uninitiated state, the system software may execute the load instruction (EADD) to copy and data into the EPC 114 in the memory. The code and data may be copied into EPC pages including thread control structure (TCS) for each logical processor that executes code of the enclave and EPC pages for storing data associated with the code execution. The load instruction may read the input data from a page information (PAGEINFO) structure containing the virtual addresses of the non-EPC pages whose contents are to be copied into the allocated EPC page, and a virtual address pointing to the EPC page for storing the enclave control structure, and values in some of the fields of the EPCM entry associated with the EPC page (SECINFO). The SECINFO may include the access permission (R/W/X) of the newly allocated EPC page and page type (regular or thread control structure). The load instruction validates inputs before modifying the newly allocated EPC page or its corresponding EPCM entry. Attempts to load a page to an enclave whose enclave control structure is in the initialized state cause a hardware exception (# GP).

Processor 102 may execute a software application residing in a secure enclave. The software application may include an enclave entry instruction (EENTER) to start the execution of the code in the enclave execution environment and an enclave exit instruction (EEXIT) to return the execution control to back to the software application that invokes the enclave.

In one embodiment, prior to executing the enclave entry instruction, the system software may set up the NEAP flag 112 stored in control register 110. The system software may execute a control register read instruction (ENEAPCTRLR) to inquire the access mode and execute a control register write instruction (ENEAPCTRLW) to set the access mode of the enclave. The control register read instruction (ENEAPCTRLR) and write instruction (ENEAPCTRLW) may operate on a per-enclave basis. The ENEAPCTRLR instruction and ENEAPCTRLW instruction may have operands of RBX, RCX, RDX, where RBX, RCX, RDX are general purpose registers of processor 102. Register RBX may store SECINFO of the current enclave, thus identifying which enclave's access mode is to be set; register RCX may store a control register identifier for identifying the control register used to store the access mode; register RDX may include the control register 110 to store the value of the access mode flag. For example, in ENEAPCTRLR instruction, register RDX may store the value of the NEAP flag 112 retrieved from control register 110. In ENEAPCTRLW instruction, register RDX may store the value of the NEAP flag 112 to be written to control register 110. The system software may detect the access mode of the enclave by calling ENEAPCTRLR. If the value of register RDX is "1," the access mode had been set to non-enclave access prevention. If the value of register RDX is "0," the access mode had not been set to non-enclave access prevention. Similarly, the system software may set the access mode of the enclave by calling ENEAPCTRLW with the value stored register RDX.

Figure 2:
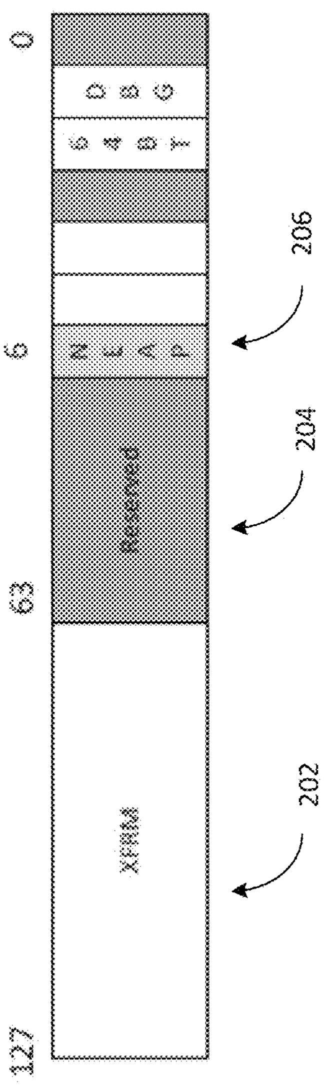
FIG. 2 illustrates an EPC page that stores the enclave control structure (SECS) according to an embodiment of the present disclosure.

In one embodiment, the enclave control structure may include an attribute to store the value of NEAP flag stored in control register 110. FIG. 2 illustrates an EPC page 200 that stores the enclave control structure (SECS) according to an embodiment of the present disclosure. As shown in FIG. 2, EPC page 200 may include a first field 202 to store a mask (XFRM) to specify a set of architecturally extensions enabled in a compiler to produce the code residing in the secure enclave. The EPC page 200 may include a second field 204 to store a set of reserved bits. In one embodiment, the reserved bits may include a NEAP flag bit 206 to indicate the enablement of NEAP for processor 102.

Figure 3:
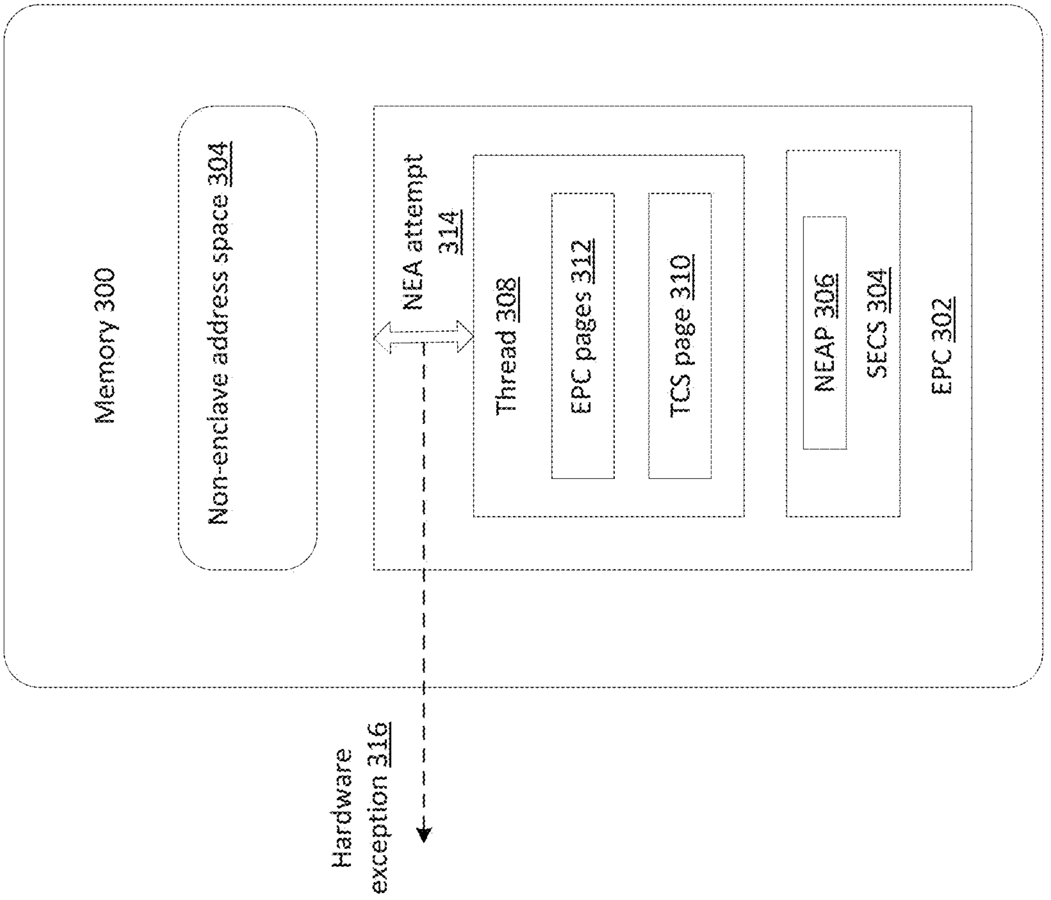
FIG. 3 illustrates a memory associated with a secure enclave according to an embodiment of the present disclosure.

FIG. 3 illustrates a memory 300 associated with a secure enclave according to an embodiment of the present disclosure. As shown in FIG. 3, memory 300 may include a non-enclave address space 304 that is not protected by an enclave execution environment and an enclave page cache (EPC) 302 that is associated with and protected by a secure enclave. EPC 302 may include EPC pages including a designated page 304 (SECS page) to store information relating to the secure enclave. The SECS page 304 may include a field to store a non-enclave access prevention (NEAP) flag 306 that is set to enable the non-enclave access prevention mode in a processor. EPC 302 may also include regular EPC pages 312 to store code and data residing in the secure enclave and Thread Control Structure (TCS) pages 310 associated with threads executing in the enclave execution environment.

As shown in FIG. 3, a coding error may cause a thread 308 executing in the enclave execution environment to make a non-enclave access (NEA) attempt 314 to access data stored in non-enclave address space 304. Responsive to detecting the NEA attempt 314 and NEAP being enabled, the processor may generate a hardware exception (e.g., # PF) 316. The exception 316 may include the identifier of the secure enclave and an identifier for the NEA attempt. In one embodiment, the operating system may intercept the exception message for debugging.

Figure 4:
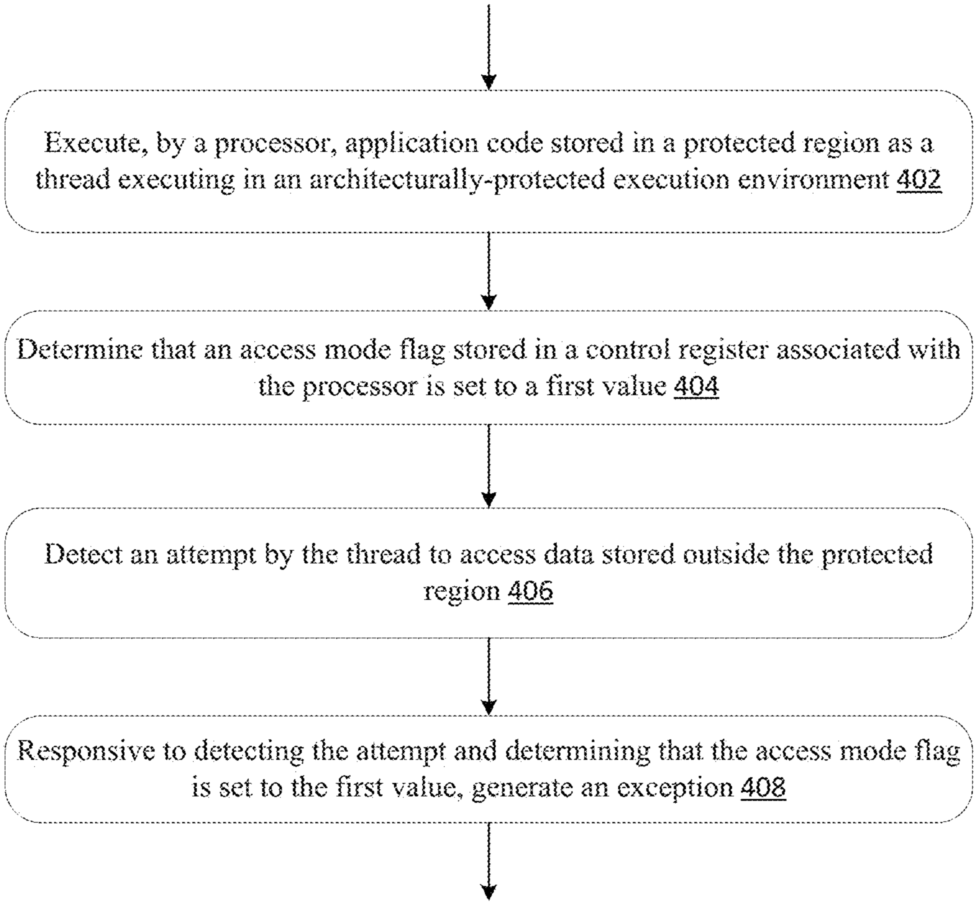
FIG. 4 is a block diagram of a method to detect a non-enclave access attempt to an embodiment of the present disclosure.

FIG. 4 is a block diagram of a method 400 to detect a non-enclave access attempt according to an embodiment of the present disclosure. Method 400 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by processing logics of processor 102 and SoC 100 as shown in FIG. 1.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Referring to FIG. 4, at 402, processor 102 including enclave logic 108 may execute application code stored in a protected region as a thread executing in an architecturally-protected execution environment.

At 404, processor 102 including enclave logic 108 may determine that an access mode flag stored in a control register associated with the processor is set to a first value.

At 406, processor 102 including enclave logic 108 may detect an attempt by the thread to access data stored outside the protected region.

At 408, responsive to detecting the attempt and determining that the access mode flag is set to the first value, processor 102 including enclave logic 108 may generate an exception.

Figure 5A:
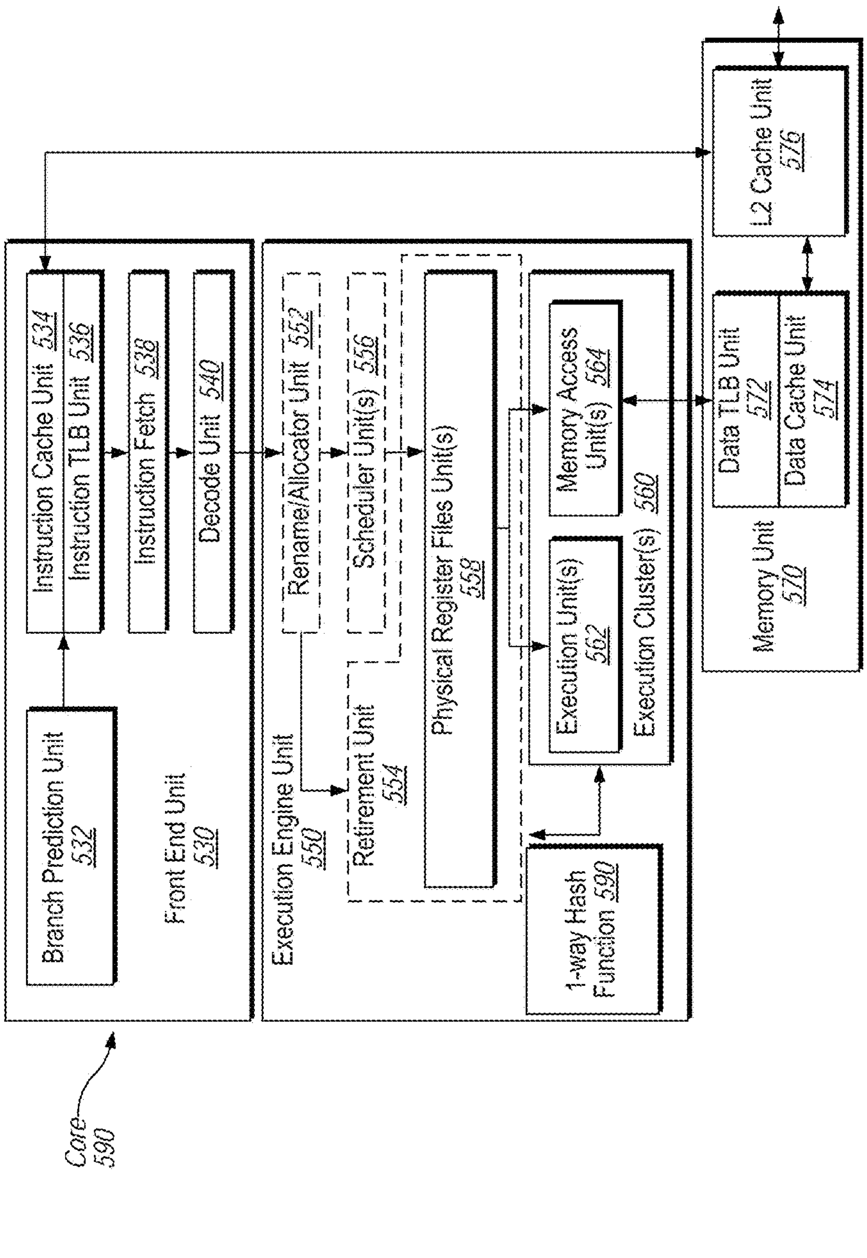
FIG. 5A is a block diagram illustrating a micro-architecture for a processor including heterogeneous core in which one embodiment of the disclosure may be used.

FIG. 5A is a block diagram illustrating a micro-architecture for a processor 500 that implements the processing device including heterogeneous cores in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 500 may be the same as processor 102 described with respect to FIG. 1.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5B:
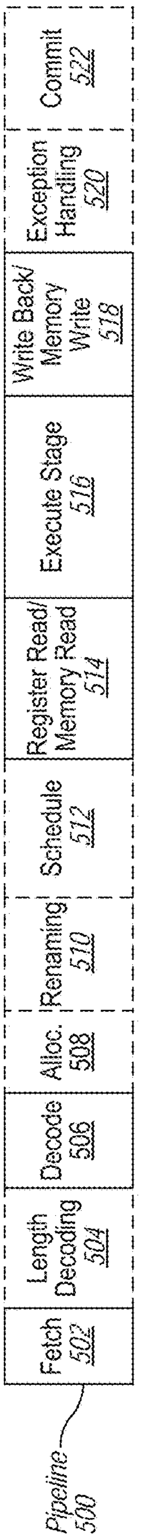
FIG. 5B is a block diagram illustrating an in-order pipeline and a register renaming stage, out-of-order issue/execution pipeline implemented according to at least one embodiment of the disclosure.

FIG. 5B is a block diagram illustrating an in-order pipeline and a register renaming stage, out-of-order issue/execution pipeline implemented by processing device 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

FIG. 6 illustrates a block diagram of the micro-architecture for a processor 600 that includes hybrid cores in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMXTM registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement hybrid cores as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
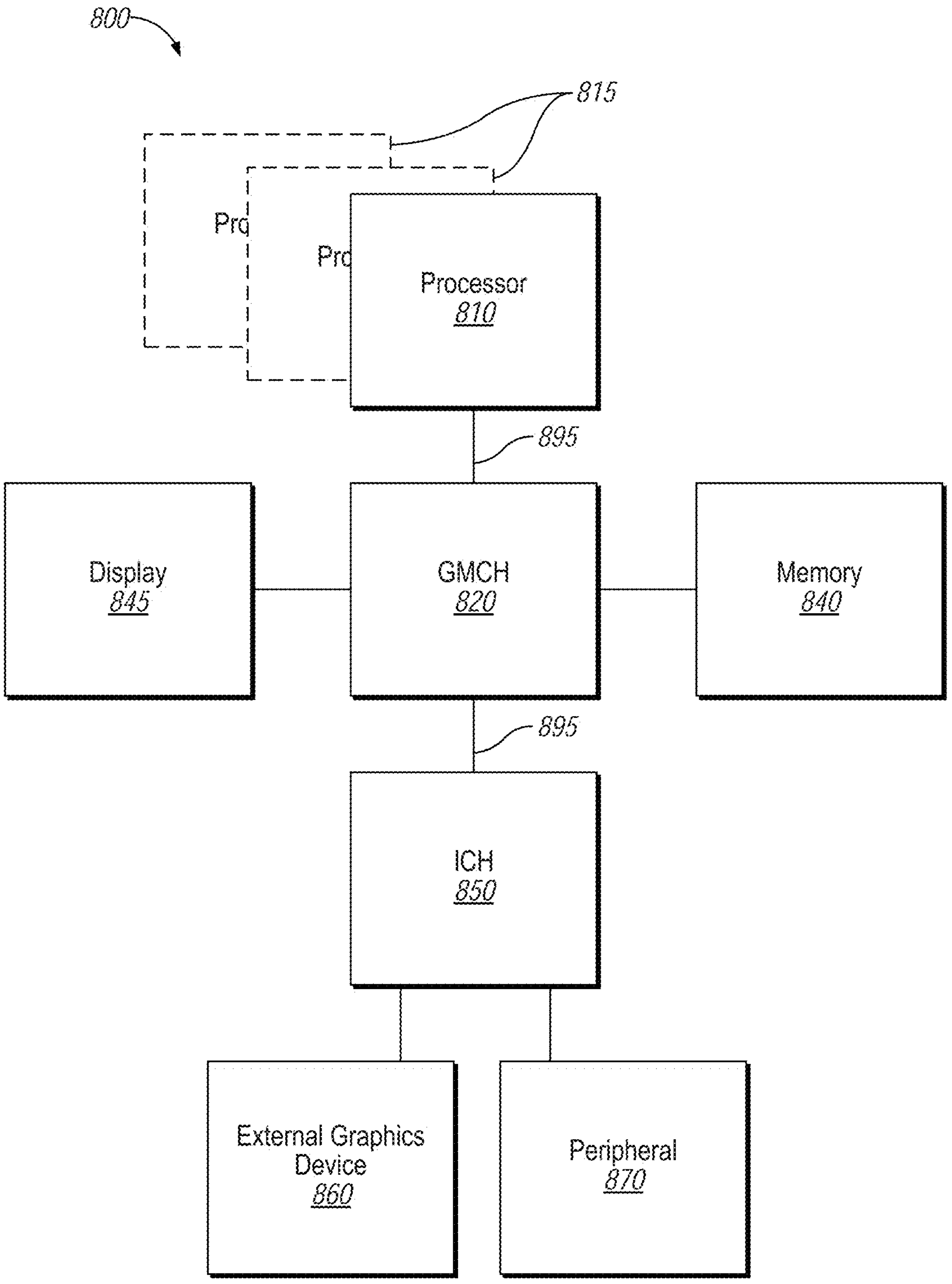
FIG. 8 is a block diagram of a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement hybrid cores according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
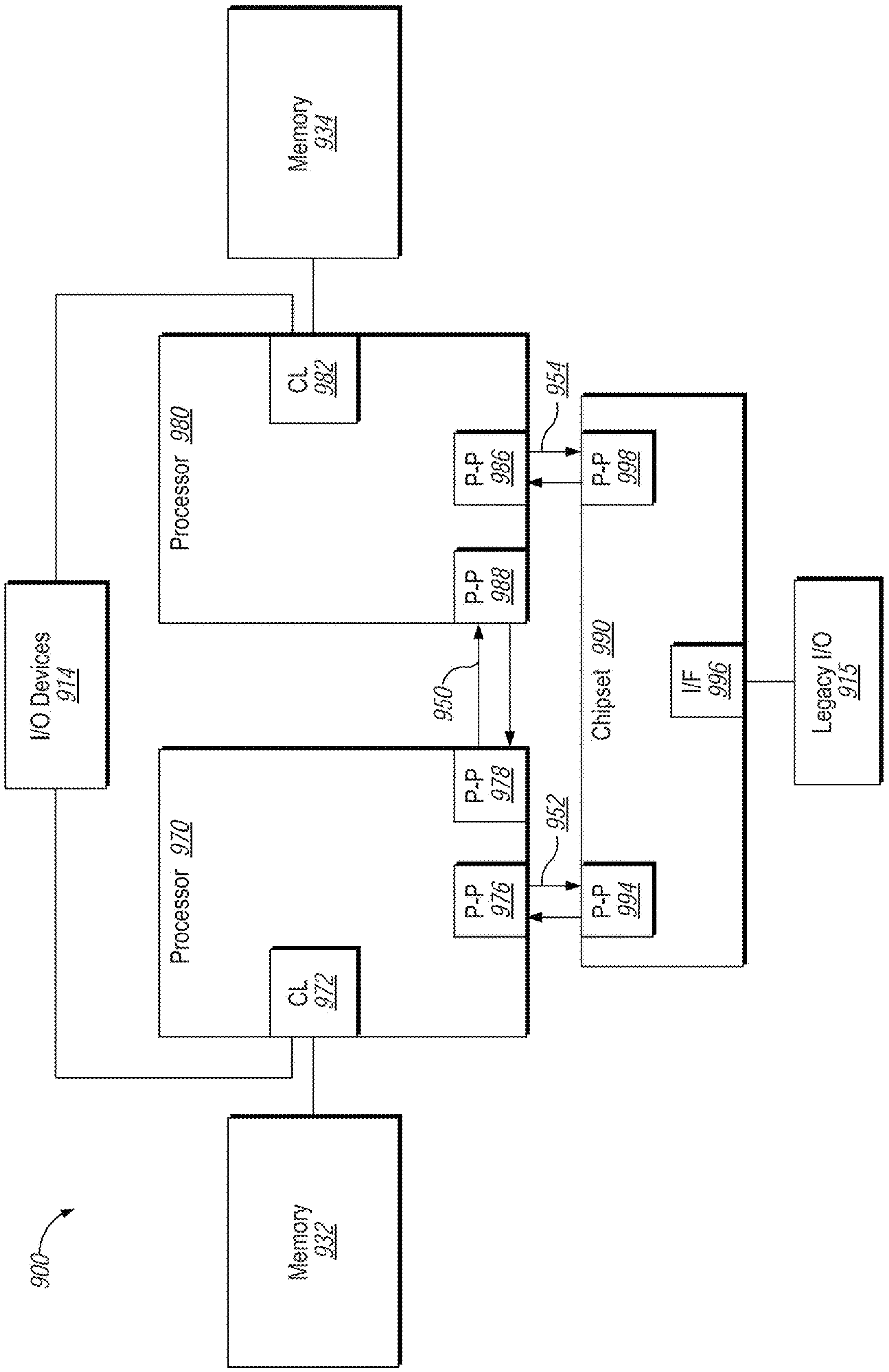
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 may implement hybrid cores as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
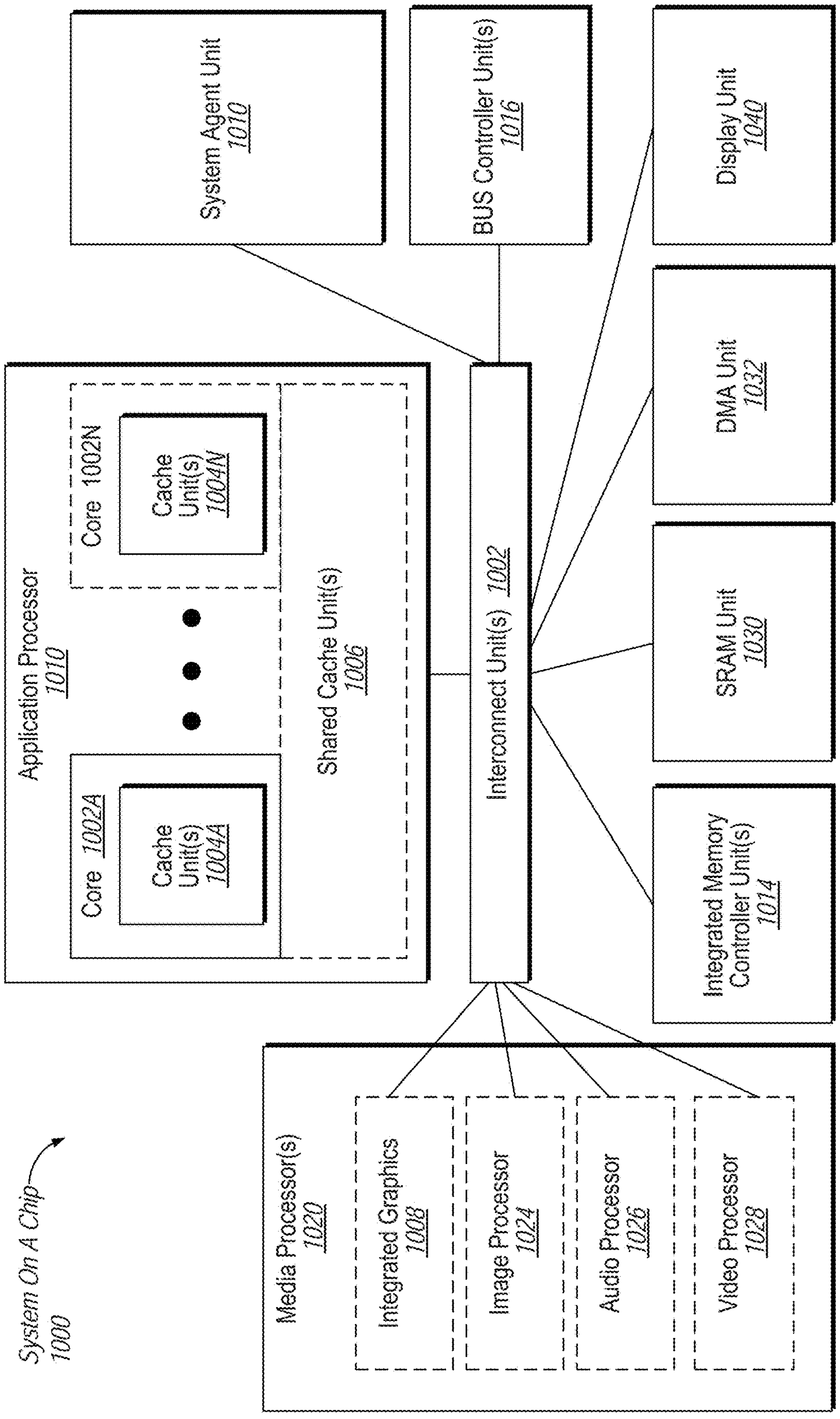
FIG. 10 is a block diagram of a System-on-a-Chip (SoC) in accordance with an embodiment of the present disclosure

Embodiments may be implemented in many different system types. FIG. 10 is a block diagram of a SoC 1000 in accordance with an embodiment of the present disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a store address predictor for implementing hybrid cores as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
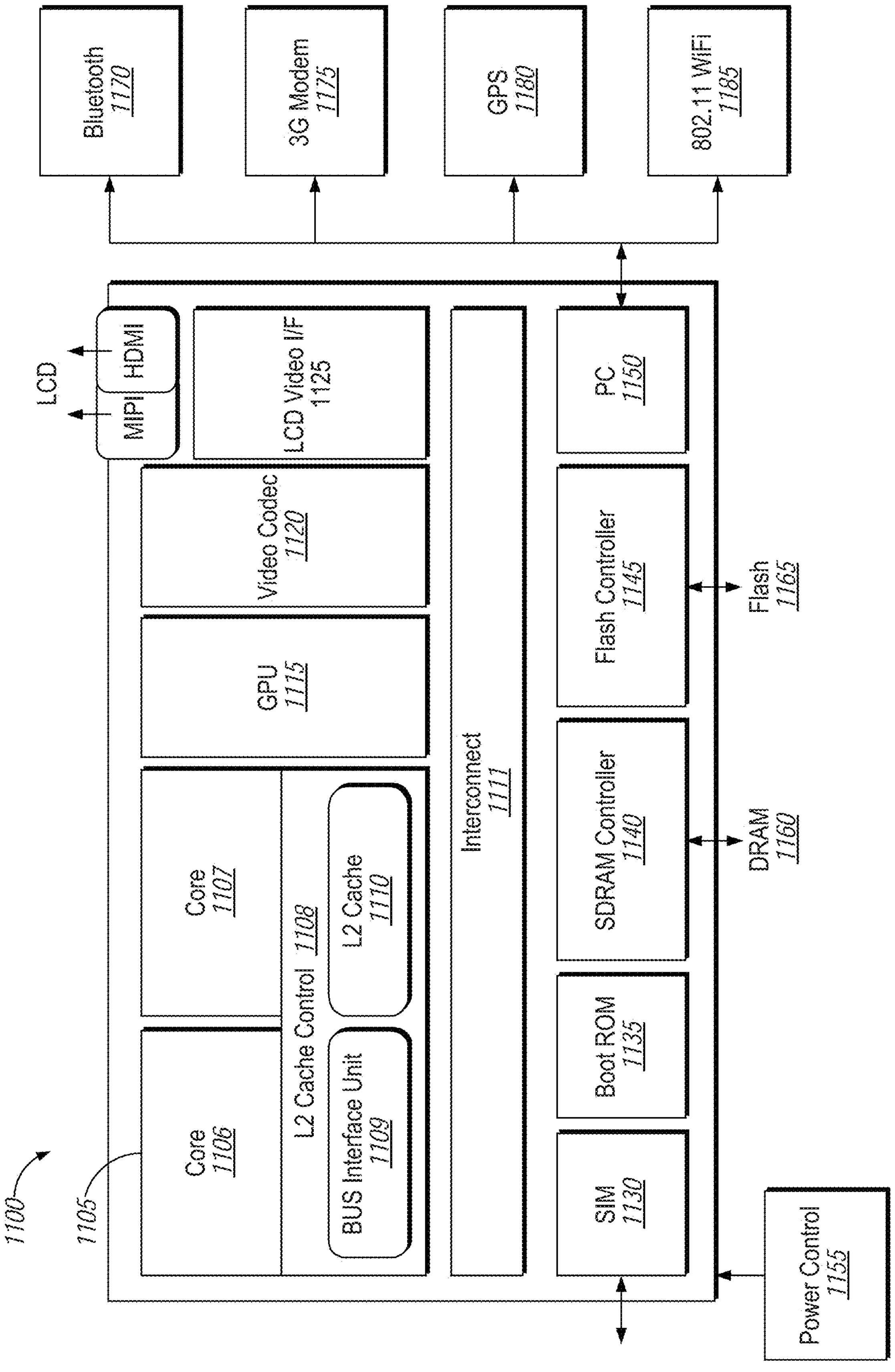
FIG. 11 is a block diagram of an embodiment of an SoC design in accordance with the present disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement hybrid cores as described in embodiments herein.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
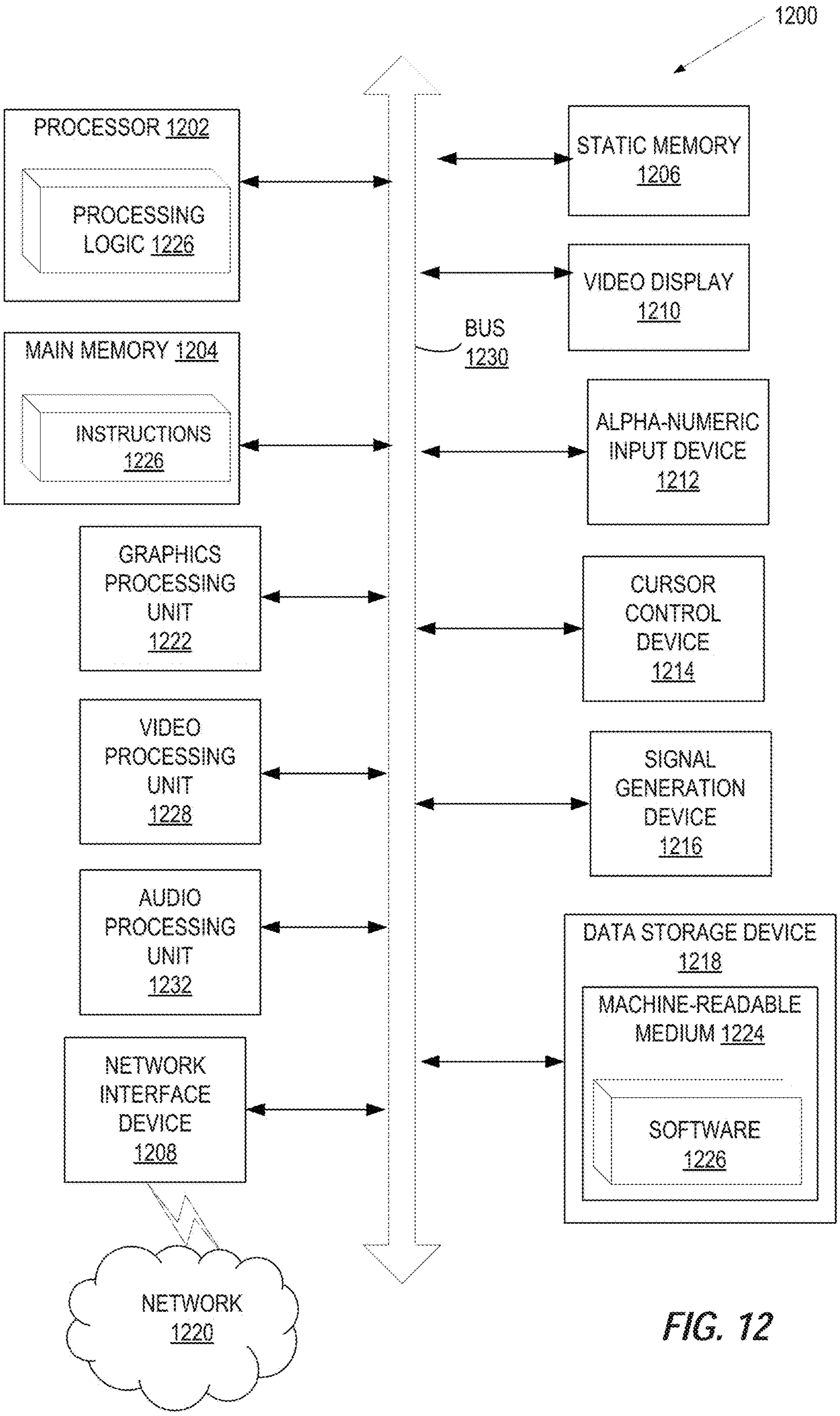
FIG. 12 illustrates a block diagram of one embodiment of a computer system.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations and steps discussed herein. In one embodiment, processing device 1202 is the same as processor architecture 100 described with respect to FIG. 1 as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction for hybrid cores such as described according to embodiments of the disclosure. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments. Example 1 is a processor including an execution unit comprising a logic circuit to implement an architecturally-protected execution environment associated with a protected region in a memory, in which the execution unit is to execute application code stored in the protected region as a thread running in the architecturally-protected execution environment, determine that an access mode flag is set to a first value, detect an attempt by the thread to access data stored outside the protected region, and responsive to detecting the attempt and determining that the access mode flag is set to the first value, generate an exception.

In Example 2, the subject matter of Example 1 may optionally provide that the architecturally-protected environment is a secure enclave execution environment implemented on the logic circuit.

In Example 3, the subject matter of Examples 1 and 2 may optionally provide that the isolated region in the memory is provided by an enclave page cache (EPC) comprising a plurality of EPC pages.

In Example 4, the subject matter of Example 3 may include a control register, communicatively coupled to the execution unit, to store a value of the access mode flag, wherein the first value of the access mode flag indicates a non-enclave access prevention.

In Example 5, the subject matter of Example 4 may optionally provide that the exception comprises at least one of a first identifier indicating the attempt to access data stored outside the EPC or a second identifier to identify the secure enclave.

In Example 6, the subject matter of Example 5 may optionally provide that the execution unit is to execute an operating system to receive the exception comprising at least one of the first identifier or the second identifier.

In Example 7, the subject matter of Example 6 may optionally provide that the execution unit is to implement at least one of: a control register write instruction for setting the access mode flag stored in the control register or a control register read instruction for retrieving the access mode flag stored in the control register.

In Example 8, the subject matter of Example 3 may optionally provide that the EPC further comprises an enclave control structure page comprising a field to store a value of the access mode flag.

In Example 9, the subject matter of Example 1 may optionally provide that the exception is a hardware exception message generated by the logic circuit.

Example 10 is a system-on-a-chip (SoC) including a memory comprising a protected region, and an execution unit, communicatively coupled to the execution unit, comprising a logic circuit to implement an architecturally-protected execution environment associated with the protected region in a memory, wherein the execution unit is to execute application code stored in the protected region as a thread running in the architecturally-protected execution environment, determine that an access mode flag is set to a first value, detect an attempt by the thread to access data stored outside the protected region, and responsive to detecting the attempt and determining that the access mode flag is set to the first value, generate an exception.

In Example 11, the subject matter of Example 10 may optionally provide that the architecturally-protected environment is a secure enclave execution environment implemented on the logic circuit.

In Example 12, the subject matter of Examples 10 and 11 may optionally provide that the isolated region in the memory is provided by an enclave page cache (EPC) comprising a plurality of EPC pages.

In Example 13, the subject matter of Example 10 may further include a control register, communicatively coupled to the execution unit, to store a value of the access mode flag, wherein the first value of the access mode flag indicates a non-enclave access prevention.

In Example 14, the subject matter of Example 13 may optionally provide that the exception comprises at least one of a first identifier indicating the attempt to access data stored outside the EPC or a second identifier to identify the secure enclave.

In Example 15, the subject matter of Example 14 may optionally provide that the execution unit is to execute an operating system to receive the exception comprising at least one of the first identifier or the second identifier.

In Example 16, the subject matter of Example 15 may optionally provide that the execution unit is to implement at least one of: a control register write instruction for setting the access mode flag stored in the control register or a control register read instruction for retrieving the access mode flag stored in the control register.

In Example 17, the subject matter of Example 12 may optionally provide that the EPC further comprises an enclave control structure page comprising a field to store a value of the access mode flag.

In Example 18, the subject matter of Example 10 may optionally provide that the exception is a hardware exception message generated by the logic circuit.

Example 19 is a method including executing, by a processor, application code stored in a protected region as a thread executing in an architecturally-protected execution environment, determining that an access mode flag stored in a control register associated with the processor is set to a first value, detecting an attempt by the thread to access data stored outside the protected region, and responsive to detecting the attempt and determining that the access mode flag is set to the first value, generating an exception.

In Example 20, the subject matter of Example 19 may optionally provide that the architecturally-protected environment is a secure enclave execution environment implemented on the processor, and wherein the isolated region in the memory is provided by an enclave page cache (EPC) comprising a plurality of EPC pages.

Example 21 is an apparatus comprising: means for performing the method of any of Examples 19 and 20.

Example 22 is a machine-readable non-transitory medium having stored thereon program code that, when executed by a processor, perform operations comprising executing, by the processor, application code stored in a protected region as a thread executing in an architecturally-protected execution environment, determining that an access mode flag stored in a control register associated with the processor is set to a first value, detecting an attempt by the thread to access data stored outside the protected region, and responsive to detecting the attempt and determining that the access mode flag is set to the first value, generating an exception.

In Example 23, the subject matter of Example 22 may optionally provide that the architecturally-protected environment is a secure enclave execution environment implemented on the processor, and wherein the isolated region in the memory is provided by an enclave page cache (EPC) comprising a plurality of EPC pages.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing system, comprising:

a control register, of a processor, to store a value of an access mode flag to indicate prevention of access to portions of a memory that are outside of a protected region of the memory; and an execution unit communicatively coupled to the control register, the execution unit comprising a logic circuit to implement an architecturally-protected execution environment associated with the protected region in the memory, wherein the execution unit is to:

execute application code stored in the protected region as a thread running in the architecturally-protected execution environment;

determine that the access mode flag is set to a first value;

detect an attempt by the thread of the application code to access data stored within unprotected address space residing outside the protected region of the memory; and responsive to detecting the attempt and determining that the access mode flag is set to the first value, generate an exception.

2. The processing system of claim 1, wherein the architecturally-protected execution environment is a secure enclave execution environment implemented on the logic circuit.

3. The processing system of claim 2, wherein the protected region in the memory is provided by an enclave page cache (EPC) comprising a plurality of EPC pages.

4. The processing system of claim 3, wherein the exception comprises at least one of a first identifier indicating the attempt to access data stored outside the EPC or a second identifier to identify the EPC.

5. The processing system of claim 4, wherein the execution unit is to execute an operating system to receive the exception comprising at least one of the first identifier or the second identifier.

6. The processing system of claim 5, wherein the execution unit is to implement at least one of a control register write instruction for setting the access mode flag stored in the control register or a control register read instruction for retrieving the access mode flag stored in the control register.

7. The processing system of claim 3, wherein the EPC further comprises an enclave control structure page comprising a field to store a value of the access mode flag.

8. The processing system of claim 1, wherein the exception is a hardware exception message generated by the logic circuit.

9. A system-on-a-chip (SoC), comprising:

a control register, of a processor, to store a value of an access mode flag to indicate prevention of access to portions of a memory that are outside of a protected region of the memory;

a memory comprising a protected region; and an execution unit, communicatively coupled to the execution unit and the control register, comprising a logic circuit to implement an architecturally-protected execution environment associated with the protected region in the memory, wherein the execution unit is to:

execute application code stored in the protected region as a thread running in the architecturally-protected execution environment;

determine that the access mode flag is set to a first value;

detect an attempt by the thread of the application code to access data stored within unprotected address space residing outside the protected region of the memory; and responsive to detecting the attempt and determining that the access mode flag is set to the first value, generate an exception.

10. The SoC of claim 9, wherein the architecturally-protected execution environment is a secure enclave execution environment implemented on the logic circuit.

11. The SoC of claim 10, wherein the protected region in the memory is provided by an enclave page cache (EPC) comprising a plurality of EPC pages.

12. The SoC of claim 11, wherein the exception comprises at least one of a first identifier indicating the attempt to access data stored outside the EPC or a second identifier to identify the secure enclave execution environment.

13. The SoC of claim 12, wherein the execution unit is to execute an operating system to receive the exception comprising at least one of the first identifier or the second identifier.

14. The SoC of claim 13, wherein the execution unit is to implement at least one of a control register write instruction for setting the access mode flag stored in the control register or a control register read instruction for retrieving the access mode flag stored in the control register.

15. The SoC of claim 11, wherein the EPC further comprises an enclave control structure page comprising a field to store a value of the access mode flag.

16. The SoC of claim 9, wherein the exception is a hardware exception message generated by the logic circuit.

17. A method comprising:

storing, by a processor in a control register, a value of an access mode flag to indicate prevention of access to portions of a memory that are outside of a protected region of the memory;

executing, by the processor, application code stored in a protected region of the memory as a thread executing in an architecturally-protected execution environment;

determining, by the processor, that an access mode flag stored in the control register associated with the processor is set to a first value;

detecting, by the processor, an attempt by the thread of the application code to access data stored within unprotected address space residing outside the protected region of the memory; and responsive to detecting the attempt and determining that the access mode flag is set to the first value, generating an exception by the processor.

18. The method of claim 17, wherein the architecturally-protected execution environment is a secure enclave execution environment implemented on the processor, and wherein the protected region in the memory is provided by an enclave page cache (EPC) comprising a plurality of EPC pages.

* * * * *